United States Patent
Krishnamurthy et al.

(10) Patent No.: US 8,701,185 B2
(45) Date of Patent: Apr. 15, 2014

(54) METHOD FOR LOCATING FRAUDULENT REPLICAS OF WEB SITES

(75) Inventors: Balachander Krishnamurthy, New York, NY (US); Greg Minshall, Los Altos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1316 days.

(21) Appl. No.: 12/287,802

(22) Filed: Oct. 14, 2008

(65) Prior Publication Data
US 2010/0095375 A1 Apr. 15, 2010

(51) Int. Cl.
*H04L 29/06* (2006.01)
(52) U.S. Cl.
CPC ........ *H04L 63/1483* (2013.01); *H04L 63/1441* (2013.01); *G06F 2221/2119* (2013.01)
USPC ............................................. 726/22; 707/705
(58) Field of Classification Search
CPC ............ H04L 63/1483; H04L 63/1441; H04L 63/1416; H04L 63/126; H04L 2209/56; G06F 2221/2119
USPC ............................... 726/22–25; 707/705–788
See application file for complete search history.

(56) References Cited

U.S. PATENT DOCUMENTS

| | | | |
|---|---|---|---|
| 6,286,006 B1 | 9/2001 | Bharat et al. | |
| 6,658,423 B1 | 12/2003 | Pugh et al. | |
| 7,802,298 B1 * | 9/2010 | Hong et al. | 726/22 |
| 2006/0123478 A1 * | 6/2006 | Rehfuss et al. | 726/22 |
| 2006/0179315 A1 * | 8/2006 | Sasage et al. | 713/173 |
| 2007/0107053 A1 * | 5/2007 | Shraim et al. | 726/22 |
| 2007/0107057 A1 * | 5/2007 | Chander et al. | 726/22 |
| 2007/0136806 A1 * | 6/2007 | Berman | 726/22 |
| 2007/0192855 A1 * | 8/2007 | Hulten et al. | 726/22 |
| 2008/0115214 A1 * | 5/2008 | Rowley | 726/22 |
| 2008/0141342 A1 * | 6/2008 | Curnyn | 726/3 |
| 2008/0162449 A1 * | 7/2008 | Chao-Yu et al. | 707/5 |
| 2009/0055928 A1 * | 2/2009 | Kang et al. | 726/22 |

OTHER PUBLICATIONS

IBM, "Method to automatically detect and prevent phishing attacks", Aug. 30, 2007, ip.com/IPCOM/000157663.*
S. Brin, J. Davis, H. Garcia-Molina, "Copy Detection Mechanism for Digital Documents" Dept of Computer Science, Stanford Univ. , ACM SIGMOD Record vol. 24, iss. 2, May 1995.
A. Muthitacharoen, B. Chen, D. Mazieres, "A Low-bandwidth Network File System" MIT Lab for Comp. Sci. and NYU Dept. of Comp. Sci., ACM SIGOPS Op. Sys. Rev v35 iss5, Dec. 2001.

* cited by examiner

*Primary Examiner* — Darren B Schwartz
*Assistant Examiner* — John B King (57) ABSTRACT

A method for detecting Web sites used for phishing, including preselecting one or more Web sites to be examined for duplication, selecting at least one or more elements that are present in the preselected Web site and that relate to characteristic identifying features of the preselected Web site, forming at least one search query using the one or more elements, and submitting the at least one search query to an indexed public search engine. The elements illustratively may be URL substrings, content identification substrings, or tree structure-related substrings. A report of Web sites using the selected one or more search terms is received from the public search engine in response to the query, and the preselected Web site is eliminated from the Web sites found in the search. The remaining Web sites retrieved in the search are further analyzed, by additional focused searching of the retrieved pages, by comparing header or tree structure information, or other techniques to compare them with the preselected Web site to identify unauthorized near-replicas of the known legitimate Web site for responsive action.

21 Claims, 7 Drawing Sheets

METHOD FOR LOCATING FRAUDULENT REPLICAS OF WEB SITES

FIELD OF THE INVENTION

The present invention generally relates to the detection of Web sites used to practice fraud, and more particularly to a method for locating Web sites replicating legitimate sites and used fraudulently for "phishing".

BACKGROUND OF THE INVENTION

E-commerce Web sites and fiduciary institutions such as banks and credit card companies face an increasing problem posed by phishing. Phishing may be generally defined as creating fake copies of legitimate Web sites and then using various ruses to try to direct unwary users to the fraudulent sites to gather identity related information for use in subsequent fraudulent transactions. Typically, a phishing site replicates unique and easily recognizable portions of a legitimate site, such as its trademarks or logos, or familiar text instructions, to delude the user into thinking he or she is on the legitimate site. Often page structure, images and text are copied directly from the legitimate site to the phishing site so that portions of the phishing site are often identical with the legitimate site. To thwart phishing, site owners constantly warn their customers not to give out identity-related information, but such warnings are insufficiently heeded in the face of clever phishing techniques.

There are two principal phishing techniques in vogue. In one phishing technique, the user is lured to the phishing site by means of a phony email message, purporting to be from the legitimate site owner, requesting the user to access a site whose link appears in the email and to enter information—such as the user's user id and password—to prevent some imminent undesired consequence, such as having the account closed. Attempts to counter this phishing technique generally are aimed at the email message used as the lure, by adopting enhanced security arrangements.

In another phishing technique, the lure is not email but the ubiquitous use of public search sites (e.g., Google or Yahoo) to find items of interest to the user. In this technique, the phishing site mimics a site that can be expected to be the target of public search requests, and relies on the similarity of the site to a genuine site and the searcher's inability to distinguish legitimate from fraudulent sites in a list of sites found in a search report. For example, during periods following natural disasters, many relief agencies solicit funds and sites set up to accept donations will be located through Web searches using general search terms such as "tsunami relief efforts" or "Darfur relief efforts". Legitimate sites are accessible to phishers and according they are able to "borrow" a substantial amount of content, such as photos of destruction, letters of appeal and gratitude, and other content for use on a phishing site. The phishing site takes advantage of the popularity of the event and the relative anonymity and/or obscurity of the relief agencies to lure unsuspecting users to the phony sites, which then request information, usually credit card information, to be subsequently used in fraudulent transactions.

A related phishing technique, also dependent on searches, but this time on a flawed search input, devises sites that are one keystroke error away from a legitimate site's URL, such as www.bank1famerica.com, taking the user to a phishing site.

In each of these phishing techniques, while the paths urging the user toward the phishing site may differ, the attempt is to lure the user to a fake Web site that mimics substantial portions of the legitimate Web site but contains a "hook"—a request for confidential identity information that, when supplied, can be used to complete fraudulent transactions.

Legitimate owners of fraudulently copied Web sites may lose business or donations. In addition, companies that users have a fiduciary connection with, such as a bank, credit card, or an e-commerce site (e.g. Amazon.com), may have to bear all or some of the costs if the customer's account is defrauded. Credit card issuers often absorb the costs of fraudulent card use and may be required by law to limit the card user's liability. Users, even if reimbursed for direct account losses, may suffer temporary loss of credit, impairment to their credit ratings and an enormously difficult and time consuming job of getting the affair resolved and records corrected.

Some approaches to thwart access to phishing sites have been adopted by browser program suppliers. Some examples include the deactivation of links in received emails, or alerting users that various sites they are accessing "might be" phishing sites if they have any characteristics the browsers may choose to associate with phishing sites. However, the present state of the art is such that phishing filters in browsers typically produce so many false positives or warnings that they frequently are seen by users as an annoying interference, and users choose to "continue" to access the sites despite the warnings.

Accordingly, it would be advantageous to enable the Web to be effectively and quickly searched to locate phishing Web sites having a structural similarity to a known site so that they can be countered before they are able to inflict significant harm. There is a further need to provide practical and economical methods arranged and configured to enable such detection.

There has been considerable work done in the prior art on structural comparison of Web sites, primarily in the context of operating search engines to detect the presence of mirrored Web sites and to disregard them so as to reduce the ongoing crawling work that a spider has to do in maintaining a search index, and to reduce redundancy in responses to a client's search query.

For example, U.S. Pat. No. 6,286,006 to Bharat et al. detects mirrored host pairs using information about a large set of pages, including URLs. The identities of the detected mirrored hosts are then saved so that browsers, crawlers, proxy servers, or the like can correctly identify mirrored web sites and not recrawl them or return redundant information in response to a search request. In the disclosure of this patent, a search engine looks at the URLs of page's hosts to determine whether the hosts are potentially mirrored.

In another example, U.S. Pat. No. 6,658,423 to Pugh et al. discloses duplicate and near-duplicate detection techniques for operating a search engine which assign a number of fingerprints to a given document by extracting parts from the document, assigning the extracted parts to one or more of a predetermined number of lists, and generating a fingerprint from each of the populated lists. Two documents are considered to be near-duplicates if any one of their fingerprints matches.

These previous techniques are adapted to find mirrored Web sites, which either are identical to hosts or are "near-duplicate" copies with insignificant content differences from the host. Pugh et al. additionally claim to be able to detect copyright infringements. However, these techniques would not be practical solutions for locating phishing sites, first, because they involve the work of completely crawling the Web (a process which is neither economical nor quick) to look for near-replicas of specific pages or portions of a Web site and then essentially to remove them from future consideration. Instead, to detect phishing, it is desirable to be able to quickly find all instances in which selected portions of one known Web site (or a few known Web sites) are present elsewhere in the Web.

The detection techniques of U.S. Pat. Nos. 6,286,006 and 6,658,423 are also not appropriate for detecting phishing sites because they require starting with a complete copy of the URLs or contents of all the sites on the Web before looking for duplications. Pugh et al. explicitly requires the presence of Web documents in toto before the fingerprints used to detect duplication can be assigned. Because an extremely tiny and evanescent fraction of Web sites are phishing Web sites, these prior art techniques—designed for the very different purpose of countering the adverse effects on Web searching of many legitimate forms of Web redundancy—are neither sufficiently focused on the desired result nor sufficiently fast to be useful in detecting phishing sites.

Another form of structural comparison is disclosed in Sergey Brin, James Davis and Hector Garcia-Molina, "Copy Detection Mechanisms for Digital Documents," *Proceedings of the ACM SIGMOD Annual Conference, San Jose* 1995 (May 1995) incorporated herein by reference. An available version of the paper can be found, for example, at http://dbpubs.stanford.edu:8090/pub/showDoc.Fulltext?lang=en&doc=1995-43&format=pdf&compression=&name=1995-43.pdf. This paper discloses a method which determines whether an identified document is a copy of a specific preidentified copyrighted article. As described in the paper "the service will detect not just exact copies, but also documents that overlap in significant ways." However, the method requires that the document to be tested for legitimacy be identified to start with, and thus would not be of use in finding a "phishing" web site whose location and existence are unknown.

Accordingly, there remains a need for a method for detecting phishing sites that is effective, efficient in the sense that it does not require massive computational capacity, and at the same is quick and simple so that legitimate Web site owners can be made aware of phishing sites without great cost and on a prompt basis.

BRIEF SUMMARY OF THE INVENTION

The present invention provides a method to look for near-replicas of known legitimate Web sites on the Web which is both simple and effective, and which makes advantageous use of current Internet indexing technology (such as that provided by AltaVista, Google, etc.) to locate sites which may be similar (in terms of structure and/or content) to a given site. The present invention does not attempt to detect all instances of duplication on the Web as in the prior art, but narrows the duplicate detection by first selecting specific known Web sites suspected of being "phished," selects substrings distinctive to the specific Web sites, and uses an available public database index to make a first search for the presence of the selected substrings in other sites on the Web. The results of this search then form a pool of candidates for further analysis with respect to additional characteristics of the selected Web sites and possible identification as phishing replicas. The first search for selected substrings and the further analysis with respect to additional characteristics lend themselves to being performed as part of a process using a software routine to perform the method steps.

There are several ways to look for the near replicas used for phishing. In one aspect of the invention, a method looks for structural similarities to a selected Web site at the URL level, which is effective if the phishing site has simply replicated the legitimate Web site including its hierarchy. Numerous search engines have a URL: search facility which allows one to look for strings in the URL database rather than the indexed contents of the Web pages. For example, AltaVista's advanced search facility has this feature. In this aspect of the invention, the method proceeds by first dividing the selected legitimate Web site's URL into a plurality of substrings, and then performing a first search for the substrings in a URL database. This is a quick search and the number of URL substrings that one has to look for is fairly limited. The search results can be fetched selectively, i.e., each substring search can be individually retrieved, and then the pages found in the first search are compared against the legitimate site's pages using additional comparison techniques to identify phishing sites. Use of a first URL search may be ineffective if a phisher elects to forego the replication of the legitimate site's URL, even though such replication might give the phishing site an enhanced appearance of authenticity, in favor of an attempt to evade detection with URL dissimilarity.

Thus, in a second aspect of the invention, the first search performed by the present detection method using indexed public search engines is for substrings present in the content of the one or more selected Web sites that are suspected of being phished. The method proceeds by selecting distinctive substrings in the legitimate Web site content that would be included in a phishing site such as those corresponding to identifying characteristics, such as trade names, trademarks, logos, taglines or familiar textual phrases, and then searching the selected one or more substrings using a public search engine. Selecting several such substrings for searching will narrow the search results, and it is likely that phishing sites will use a plurality of such identifiers in order to appear legitimate. Search results obtained from such content substring searches are then further analyzed for comparison to the selected legitimate Web site. Such further analysis may take the form of visual scrutiny, further searching of the first search results or focus-crawling of the first search results to compare individual pages. Other comparison techniques, such as examining meta-information (e.g., through HEAD method requests) to compare attributes such as byte count may be used to look for similarities.

If the tree structure of a legitimate site is essentially copied into a phishing site, with a few minor changes, even with different URLs, the intra-site link structure of the two sites will be very similar. Thus, in another aspect of the invention, the identifying characteristic of the Web site that is suspected of being phished is the tree structure of its intra-site links. The tree structure of the selected Web site is identified, and compared with suspected phishing sites to find those that have similar tree structures.

Given that the methods of the present invention provide a low cost way to detect near replicas used for phishing, it is possible to use them to offer a service to periodically compare any selected site or portion of a selected site against what is on the Web to look for new occurrences of illegitimate replicas or near-replicas. Therefore, in another aspect of the invention, a method periodically conducts one or more of the searches described above, e.g., on behalf of a fiduciary site or an e-commerce site, to look for phishing sites that are popping up in different parts of the Internet, and in another aspect the method includes a service that periodically searches for phishing sites.

Given the low cost associated with the present invention, and its ability to leverage the use of public search indices already created for general searching purposes, it is possible to offer an end-user service to detect phishing which would be fast and effective.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
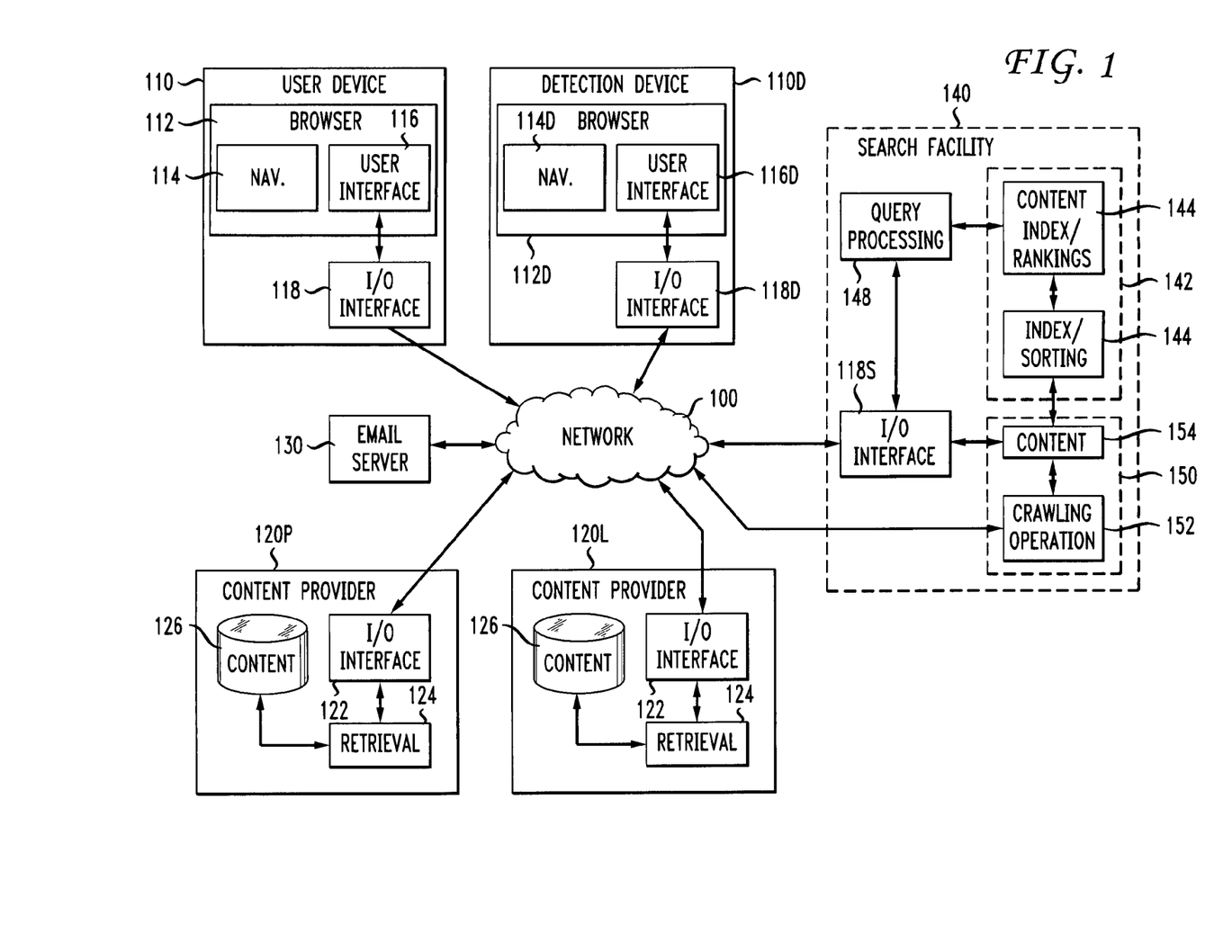
FIG. 1 is a block diagram showing elements of the Internet involved in phishing, as well as elements used in detecting phishing sites using methods according to the invention.

FIG. 1 is a high-level block diagram showing the environment in which phishing takes place together with some aspects of the present invention for detecting phishing sites. This environment includes a network 100 (such as the Internet for example) through which a user, by means such as a customer-user device 110, accesses information from one or more content providers (servers) 120. For illustrative purposes, FIG. 1 shows a content provider 120L which represents a legitimate Web site operated, for example, by a financial institution to provide account services to customers, such as bill payment, credit card payment, account transfers, and wire transfers. Content provider 120P represents a phishing Web site which is an unauthorized replica of the legitimate Web site 120L to be used for fraudulent purposes, such as obtaining account identity and password information that will allow the operators of the phishing Web site to fraudulently access the user's account.

Also shown in FIG. 1 is an email server 130 through which customer-user device 110 sends and receives email messages, and a search facility (server) 140 (such as that operated by Google, Inc. or AltaVista) which Web-crawls and indexes Web content and permits customer user device 110 to submit a search query to the search facility 140 to retrieve content of interest on the Web in response to a search request. As pointed out above, when a user submits a search query to the search facility 140 to retrieve content of interest, the search results may include content from the near-replica phishing Web site 120P in addition to, or instead of, content from the legitimate Web site 120L, and the user may then enter, and be taken in by, the fraudulent site 120P.

FIG. 1 also illustrates a phishing site detection device 110D in accordance with the present invention that performs the methods of the present invention to detect illegitimate replicas of selected legitimate Web sites, such as site 120L. Illustratively, the selected Web site is the legitimate site 120L, and the intended purpose of the method performed by the detection device 110D is to detect illegitimate phishing site 120P.

The customer-user device 110 may include a browser 112 which may include a navigator 114 and a user interface 116. The browser 112 may access the network 100 via input/output interface 118. For example, in the context of a personal computer, the browser 112 may be a browser such as "Internet Explorer" from Microsoft Corporation of Redmond, Wash., or "Netscape" from Netscape Communications, Inc. and the input/output interface may include a telephone or cable modem or network interface card (or NIC) and networking software. Other examples of possible user devices 110 include wireless devices, such as personal digital assistants and mobile telephones. The user device 110 may connect with email server 130 using an email program such as Microsoft Office Outlook arranged to access the user's email account at email server 130.

Figure 1A:
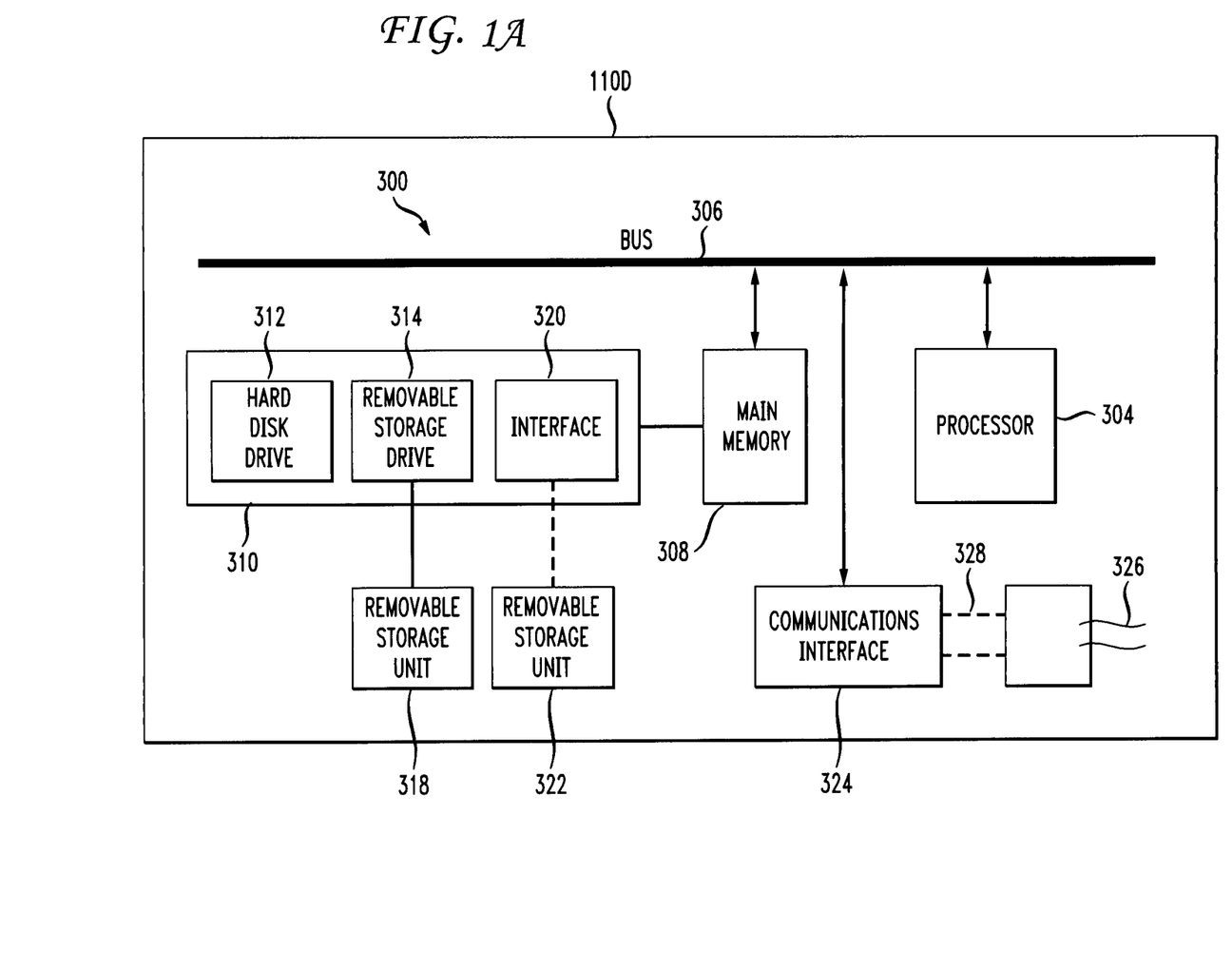
FIG. 1A is a block diagram showing details of a computer system suitable for running software performing the methods of the present invention to operate a phishing site detection device according to the invention.

The phishing site detection device 110D includes processors and memories shown in greater detail in FIG. 1A that are arranged to receive, store and perform software instructions which carry out the methods of the present invention. The functions of such processors may be implemented using hardware, software or a combination of the two and may be implemented in a computer system 300 as shown in FIG. 1A. The present invention, in one aspect, is directed to one or more computer systems capable of carrying out the methods of the invention; in another aspect, the present invention is directed to a computer-usable program code storage medium to cause a computer to perform the methods of the invention. Various software embodiments are described in terms of the example computer system 300 shown in FIG. 1A. After reading this description, it will become apparent to a person skilled in the relevant art how to implement the invention using other computer systems and/or computer architectures.

The computer system 300 shown in FIG. 1A includes one or more processors, such as processor 304. The processor 304 is connected to a communication bus 306. Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, or similar device which is read by and written to by removable storage drive 314. As will be appreciated, the removable storage unit 318 includes a computer usable storage medium for storing computer software and/or data.

In alternative embodiments, secondary memory 310 may include other similar means for allowing computer programs or other instructions to be loaded into computer system 300. Such means can include, for example, a removable storage unit 322 and an interface 320. Examples of such include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices, such as the network 100 shown in FIG. 1. Examples of communications interface 324 can include a modem, a network interface (such as an Ethernet card), a communications port, a PCMCIA slot and card, etc. Software and data transferred via communications interface 324 are in the form of signals which can be electronic, electromagnetic, optical or other signals capable of being received by communications interface 324. These signals 326 are provided to communications interface 324 via a channel 328. This channel 328 carries signals 326 and can be implemented using wire or cable, fiber optics, a phone line, a cellular phone link, an RF link and other communications channels.

In this specification, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). It will be apparent that the invention may be implemented using a combination of both hardware and software.

The search device 110D may include a browser 112D which may include a navigator 114D and a user interface 116D. The browser 112D may access the network 100 via input/output interface 324. For example, where the computer system 300 is provided by a personal computer, the browser 112D may be a browser such as "Internet Explorer" from Microsoft Corporation of Redmond, Wash., or "Netscape" from Netscape Communications, Inc. and the communications interface 324 may include a telephone or cable modem or network interface card (or NIC) and networking software.

Referring again to FIG. 1, each of the content providers 120L or 120P may include stored resources or content 126, a resource retrieval device 124 that accesses and provides content in response to a request, and input/output interfaces 122. These operations of the content providers 120 may be performed by computers, such as personal computers or servers for example. The stored resources 126 may be embodied as data stored on a storage medium such as a magnetic disk. In this particular example, the stored content may be interpreted to include addressable content, such as a Web page or pages constituting a Web site for example.

The public search facility 140 may perform crawling, indexing/sorting, and query processing functions. At a crawling facility 150, a crawling operation 152 gets content from various sources accessible via the network 100, and stores such content, or a form of such content, as indicated by 154. Then, at an automated indexing/sorting facility 142, an automated indexing/sorting operation 144 may access the stored content 154 and may generate a content index (e.g., an inverted index) and content ratings (e.g., page ranks) 146. Finally, a query processing operation 148 accepts queries and returns query results based on the content index (and the content ratings) 146. Input-output interface 118S connects the search facility 140 with the network 100. The crawling, indexing/sorting and query processing functions may be performed by one or more computers.

User device 110 may connect with and access content from content providers 120L and 120P by entering their URLs in browser 112, either manually by entering a URL or by clicking on a hypertext link in a document, such as in a Web page retrieved by entering a URL or in a Web page obtained as a result of making a search query to the search facility 140.

A typical phishing scam is one in which the phishing site 120P is made to mimic the content of a legitimate site 120L which is operated by a legitimate owner, such as a fiduciary institution offering banking or credit card services. In this example, the user device 110 submits a search query to search facility 140 with a search request such as "Citibank credit card payment".

The operator of legitimate site 120L alternatively may be a charitable institution, which exists for the purpose of providing information about, and soliciting donations for, a general charitable purpose such as an emergency relief effort, or an effort to combat a medical condition, such as Alzheimer's disease. In this example, the user device 110 submits a search query to search facility 140 with a generic search request for "tsunami relief efforts" or "Alzheimer's disease" for example.

In either of the search examples above, because the phishing site 120P contents are replicas or near-duplicates of the legitimate site 120L, the search report from search facility 140 will likely return both the legitimate site 120L and the phishing site 120P in a search report. A certain number of users then will access the phishing site 120P in the mistaken belief they are accessing legitimate site 120L, and will then be induced to submit confidential information such as credit card information that subsequently will be used fraudulently.

Even gullible users will balk if the phishing site 120P is transparently phony or totally unfamiliar, so invariably the phishing site 120P incorporates several familiar characteristic features of the legitimate institution's real Web site 120L. In general, a phishing Web site will try to look similar to the legitimate Web site at the visible level (even though there will be key changes geared to the site's nefarious purpose of eliciting identity information).

Figure 2:
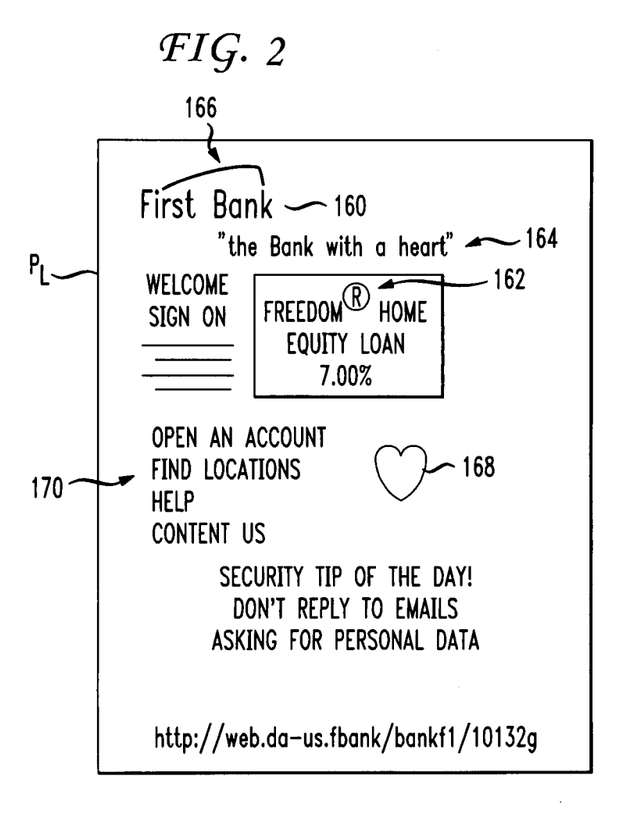
FIG. 2 shows a diagram of the features of an example of a legitimate Web site page.
Figure 3:
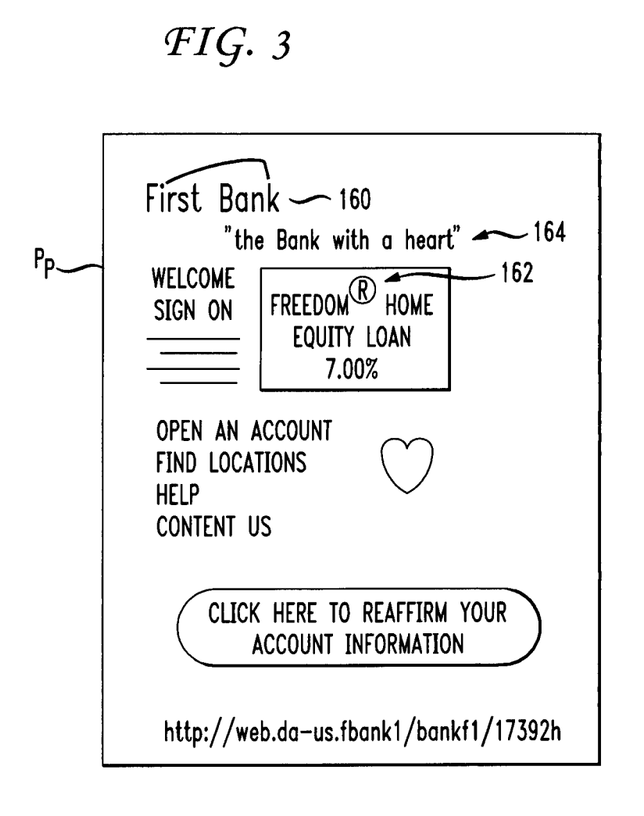
FIG. 3 shows a diagram of the features of an example of a Web site page used for phishing and replicating portions of the legitimate Web site page.

FIGS. 2 and 3 show respectively examples of a real Web site page $P_L$ from a financial site 120L, and a phishing Web site page $P_P$ from site 120P. The distinctively recognizable and characteristic features of the legitimate site that predictably are copied in the phishing site include one or more of the following: the trade name 160 of the site owner (for example, "First Bank"), trademarks or service marks 162 of the site owner ("Freedom" banking services), taglines 164 ("the bank with a heart"), formats 166 of typefaces, design logos 168, standard blocks of text 170, and page layout styles (relative locations of page elements). Often, a home page of the legitimate site 120L will be copied in its entirety, with the user being instructed to access a linked page by clicking on an intra-site link heading such as "user preferences" which then takes the user to a special page created by the phishing operator, which may itself mimic a page from the legitimate Web site 120L but deliver the information entered on that page to the phishing operator. The URL of the phishing site 120P may copy substrings of or the hierarchical structure of the URL of the legitimate site 120L, as shown by the URLs associated with FIGS. 2 and 3.

Where the legitimate site 120L is a charitable institution, as in the second example of a phishing scam given above, the distinctively recognizable and characteristic feature of the legitimate site 120L that are predictably copied will include the topic of the charity ("tsunami" or "Alzheimer's"), the name of the charity, information about celebrities or other persons associated with the charity, pictures, letters and the like.

Even though the page $P_P$ from phishing site 120P will invariably copy many or all of the characteristic features of a page $P_L$ from legitimate site 120L, as indicated above, it also will invariably have the property, because of the need to implement its fraudulent purpose, that it contains differences from the legitimate site which will prevent it from being identified as a "mirror" or "near-duplicate" of the legitimate site by the search engine techniques described above with reference to U.S. Pat. Nos. 6,286,006 and 6,658,423. Accordingly, the public search facility 140 shown in FIG. 1 that crawls the Web content and creates an search index of the Web (and disregards mirror sites) will include in its index references to the phishing site 120P in addition to references to the legitimate site 120L (while disregarding sites that are true mirrors to site 120L).

Applicants have discovered that these characteristic similarities and dissimilarities between the legitimate site 120L and phishing site 120P allow phishing sites to be found by methods which include first, selecting one or more legitimate sites suspected of being the object of a phishing scam (or sites for which a repeated periodic search for replicas is desired), then selecting distinctive substrings of the legitimate sites and submitting first search queries for these substrings to a public search facility which previously has crawled the Web and indexed its content, and then further analyzing the results of such first search queries to compare them to the preselected legitimate site to locate unauthorized replicas that are phishing sites. Such methods are relatively quick and simple, use search resources that are readily available and frequently updated, lend themselves to searching using computer software arranged to perform the method steps, and require very little time and computing equipment compared to techniques which require massive Web crawling to take place.

Figure 4:
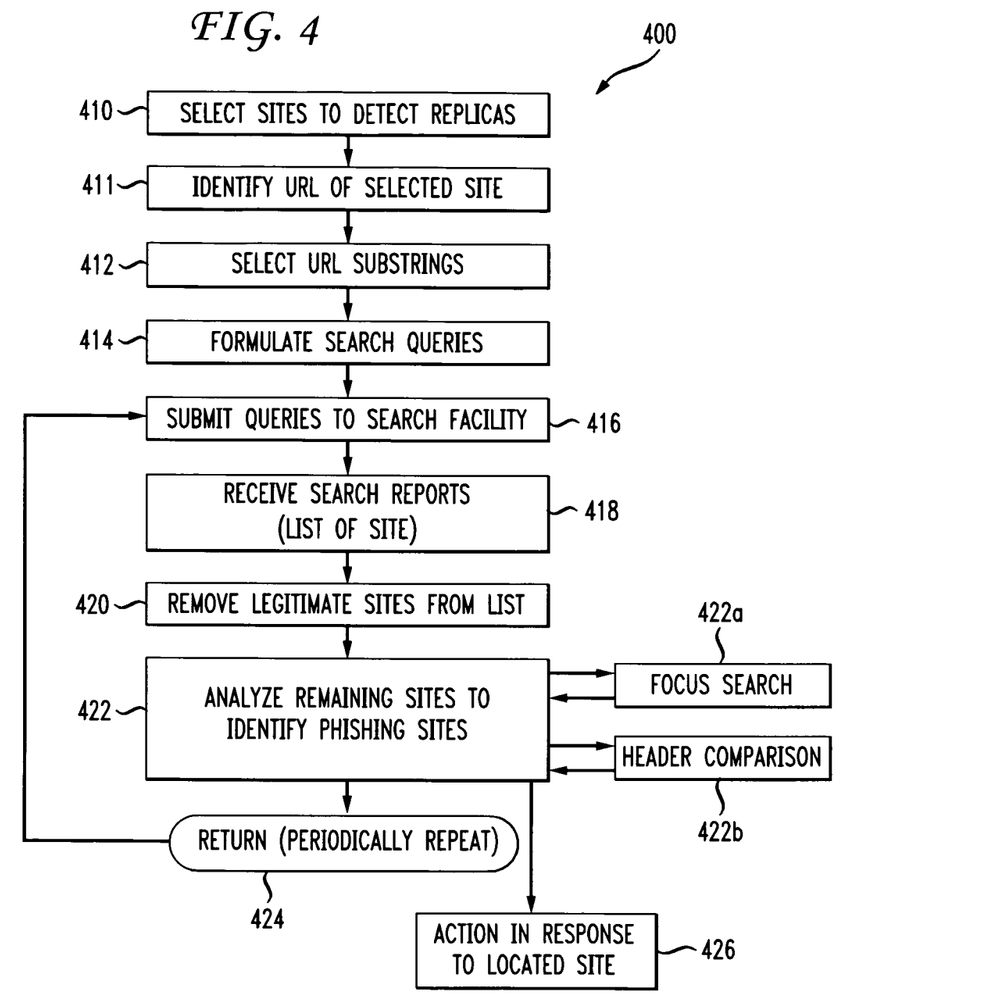
FIG. 4 shows a schematic diagram of a first method according to the invention.
Figure 4A:
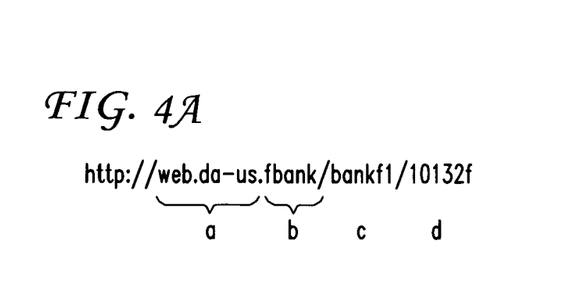
FIG. 4A shows a URL associated with a legitimate Web site.

A first method 400 for finding a phishing site according to the invention is shown in flow diagram form in FIG. 4. Method 400 proceeds in step 410 by selecting one or more legitimate Web sites, such as 120L, for which phishing replicas are to be found. In step 411, the method identifies the URL of the selected legitimate site 120L (an illustrative example of which is shown in FIG. 4A). In step 412, substrings of the URL (such as substrings a, b, c and d indicated in FIG. 4A) are selected.

In step 414, search queries using the selected URL substrings are formulated. For example, a search query for the URL substrings in FIG. 4A might be "us-fbank." Techniques for selecting URL substrings for optimal searching are suggested in "A Low-bandwidth Network File System" by Athicha Muthitacharoen, Benjie Chen and David Mazieres of MIT, incorporated by reference, a copy of which is located at http://pdos.csail.mit.edu/papers/lbfs:sosp01/lbfs.pdf In step 416 the search queries are submitted to a public search facility, such a search facility 140 in FIG. 1, that is able to search URLs. Such URL searching facilities are available, an example being the search facility offered by AltaVista. In step 418 the search reports are received. Such search reports typically will be in the form of a list of Web sites responsive to the query, with snippets of information relating to each of the sites. In step 420 the retrieved sites are compared with legitimate site 120L (and any other legitimate related sites that may have been preselected) and all the legitimate duplicate sites are removed.

In step 422, the remaining candidate sites retrieved in the search report are further analyzed to determine if they have further characteristics that would identify them are phishing sites. The analysis of step 422 may be accomplished by a visual comparison of sites, or alternatively, the analysis step 422 may include a step 422a of performing a focus search of the identified sites to quantify similarity, or a step 422b of comparing page details in header information, such as byte count, to identify similarity. As noted above, the tree structures of intra-site links in legitimate sites can be expected to be duplicated in phishing sites, and therefore a comparison of tree structures can help verify whether sites identified by URL substring searching are phishing sites. The structures can be compared for the overall site, as well as the relative locations (or number of pages) where searched common substrings occur.

In step 426, the sites which analysis step 422 detects as fraudulent replicas or near-duplicates have appropriate action taken in response. Such action may include, for example, alerting the institution which owns legitimate site 120L, alerting law enforcement authorities, posting information about the detected site, or initiating steps to deny access to the detected site. The foregoing method 400 efficiently detects phishing sites because it is able to work from data already collected and indexed by search engines, and does not require the billions of pages on the Web to be reexamined.

The method 400, as described above, is one that can be performed by a detection device 110D that, as shown in FIG. 1, has access to public search facility 140 over the Internet 100. The steps of method 400 advantageously can be performed by software instructions controlling the computer system of FIG. 1A. Because the public search facility has already created and maintains an index of the Web, the search can proceed rapidly and results obtained quickly. Because results are quickly obtained, the method 400 can be repeated as shown in FIG. 4 by return loop 424 on a periodic basis, for example once a day, as a service provided to legitimate site owners for fraud prevention.

Figure 5:
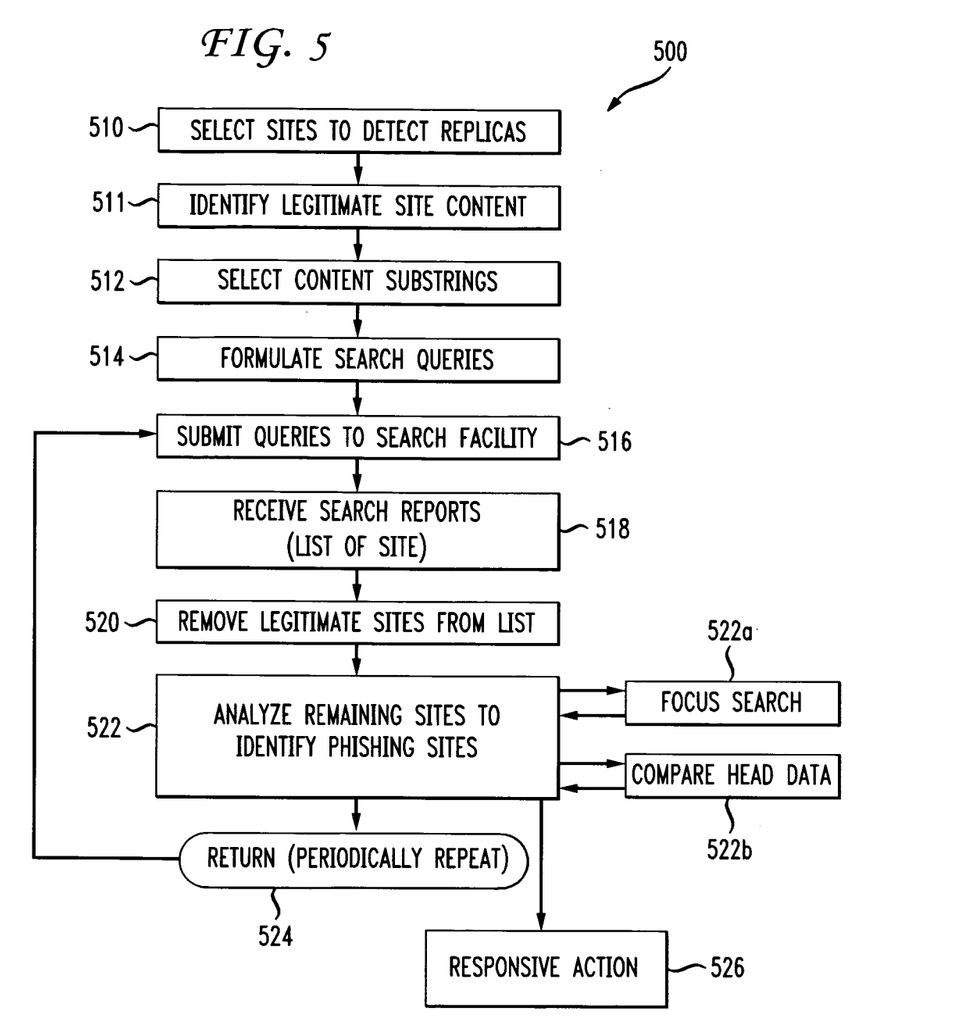
FIG. 5 shows a diagram of a second method according to the invention.

FIG. 5 illustrates a second method 500 according to the invention for finding a phishing site according to the invention. In method 500, step 510 preselects one or more legitimate sites for which replicas are to be found. In step 511, the method identifies the content of legitimate site 120L, and in step 512 substrings of content of the legitimate site 120L are selected. Such substrings may correspond to distinctive, characteristic content of the site, and may be the characteristic and easily recognized features previously identified in FIG. 2, such as trade name, trademarks or service marks, taglines, formats, designs, or text blocks of the legitimate site.

In step 514, search queries using the selected substrings are formulated. For example, a series of search queries based on the example of FIG. 2 might be "first bank" and "the bank with a heart" and the code for the "heart" logo.

Alternatively, or additionally, substrings may be selected on the basis of the tree structure of the intra-site links of the legitimate site 120L as described below with reference to FIGS. 6 and 7.

In step 516 in method 500 the search queries are submitted to a public search facility such as the facility 140 shown in FIG. 1. Such searching facilities for content are available, an example being the search facility offered by Google. In step 518 the search reports are received. Such search reports typically will be in the form of a list of Web sites responsive to the query, with snippets of information relating to each of the sites. In step 520 the received list of sites is compared with legitimate site 120L (and any other legitimate related sites that may exist) and all the legitimate sites removed.

In step 522, the remaining sites in the search report are further analyzed to determine if they have further characteristics that would identify them are phishing sites. Step 522 may be accomplished by a visual comparison of sites, or alternatively, the analysis step 522 may include a step 522a of performing a focus search of the identified sites to identify similarity, or a step 522b of comparing header information, such as byte count, to identify similarity. In step 526, the sites which analysis step 522 detects as fraudulent replicas or near-duplicates have appropriate action taken in response. Such action may include, for example, alerting the institution which owns legitimate site 120L, alerting law enforcement authorities, posting information about the detected site, or initiating steps to deny access to the detected site.

The method 500, as described above, is one that can be performed by a detection device 110D that, as shown in FIG. 1, has access to public search facility 140 over the Internet 100. The steps of method 500 advantageously can be performed by software instructions controlling the computer system of FIG. 1A. Because the public search facility has already created and maintains an index of the Web, the search can proceed rapidly and results obtained quickly. Because results are quickly obtained, the method 500 can be repeated as shown by return loop 524 on a periodic basis, for example once a day, as a service provided to legitimate site owners for fraud prevention. Methods 400 and 500, which look for similarities in URLs, content and structure, can be run serially or combined, repeated periodically, and offered as a service to detect fraud.

Figure 6:
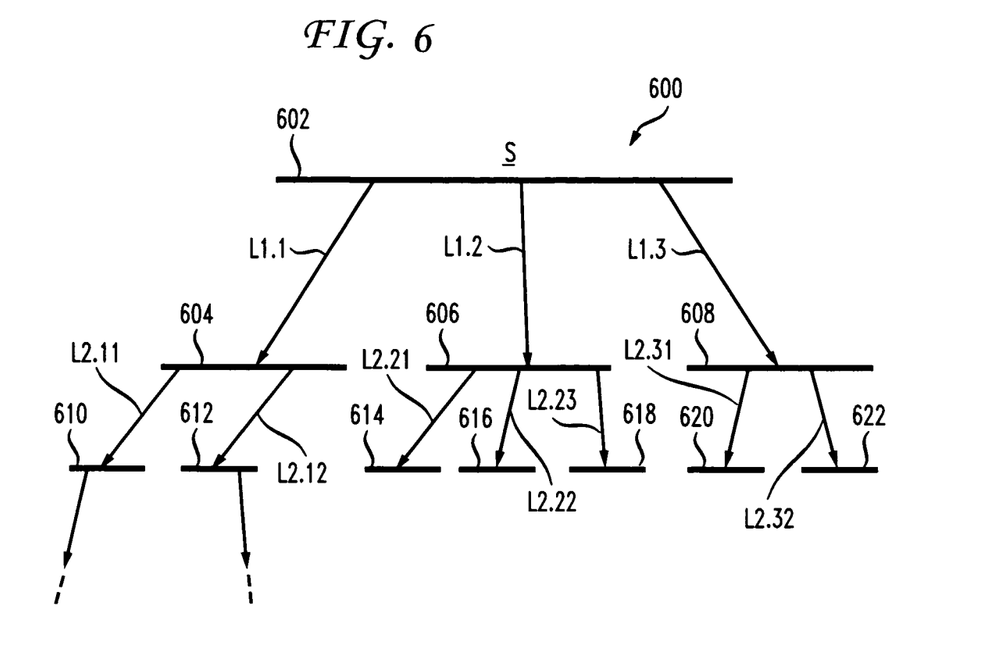
FIG. 6 shows a diagram of a tree structure of the intra-site links of an exemplary Web site.

FIG. 6 is a diagram of a tree structure 600 of an exemplary site S whose pages have intra-site links to other pages. For example, the home page of a news site may have links to "business", "sports" and "entertainment". The "business" page further may be linked to "finance", "stocks" and "currency exchange", and "sports" further may be linked to "baseball", "football" and so forth. As illustrated graphically in FIG. 6, the tree structure of site S has a home page 602 with links L1.1, L1.2 and L1.3 branching to pages 604, 606 and 608. Page 604, in turn, has links L2.11 and L2.12 branching to pages 610 and 612. Similarly, pages 606 and 608 have links L2.21, L2.22 and L2.23 to pages 614, 616 and 618 and links L2.31 and L2.32 to pages 620 and 622. The pages 614 through 622 may, in turn, have further links to further pages (which, for simplicity of illustration are not shown). The number and tier location of the links (branches) form what is referred to as the tree structure of the site S. The tree structure of site S may be determined by a visual inspection of the links on pages 602 through 620 and graphically represented as shown in FIG. 6, or may be detected by a computer program analysis of the links of a site S and numerically represented, using computer programs known to the art.

Figure 7:
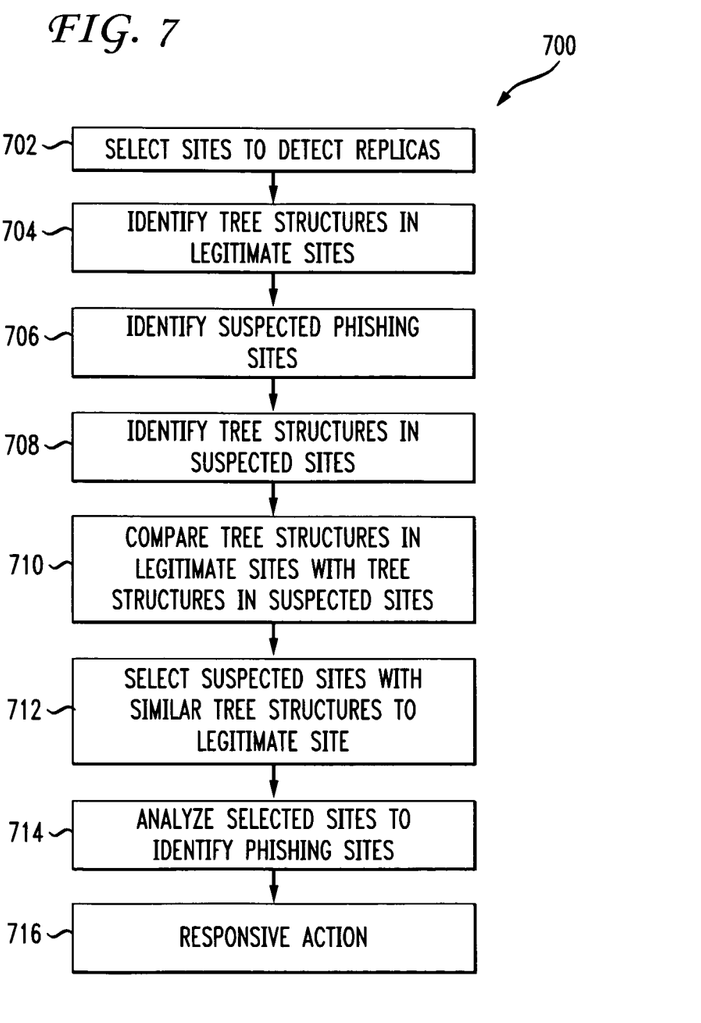
FIG. 7 shows a diagram of a method for locating phishing sites using tree structures.

FIG. 7 shows a method 700 arranged to search for replicas or near-duplicates of a legitimate site 120L by searching for duplicate or near-duplicate tree structures. Step 702 preselects sites to be searched and step 704 identifies tree structures in the preselected sites, preferably using known computer program techniques. In step 706, suspected phishing sites are identified, as for example using the search methods 400 or 500 illustrated in FIGS. 4 and 5. Alternatively, a search technique can be devised to look for tree structures directly, but in most instances it is preferable to narrow the list of suspected sites first using a URL or content search. In step 708 the suspected sites have their tree structures analyzed, preferably using known computer program techniques. In step 710, the tree structures of the legitimate sites are compared with the tree structures of the suspected sites to detect sites with similar (i.e., duplicate or near-duplicate structures), and in step 712 suspected sites which have tree structures which are duplicates or near-duplicates of the legitimate sites are selected. As will be apparent to those skilled in the art, the comparison step 710 preferably is controlled to select a degree of similarity between tree structures which is sufficiently focused to effectively target duplicate sites but not so focused as to permit minor changes in tree structure by phishing sites to evade detection. In step 714 the selected suspect sites with duplicate or near-duplicate tree structures may be further analyzed, e.g., by using previously described techniques or a visual inspection, to identify sites that are phishing sites, and in step 716 responsive actions may be taken to counter the identified phishing sites. The method 700 which has been described can be used, for example, as part or all of step 422 in FIG. 4 or step 522 in FIG. 5, or can be operated as a stand-alone method to search for and analyze suspected phishing sites.

Thus, the invention describes a method enabling a phishing site to be detected. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

We claim:

1. A method for locating a previously undetected phishing Web site, comprising:
    selecting a legitimate Web site;
    selecting an indexed public search engine that previously has crawled the Web, has identified mirror Web sites, and has created an indexed database of Web sites containing data already collected and indexed and excluding mirror Web sites that it uses to respond to search queries;
    examining the indexed database of the selected public search engine for the presence of an unauthorized phishing Web site of the selected legitimate Web site, the unauthorized phishing Web site having differences from the legitimate Web site that prevent it from being identified as a mirror of the legitimate Web site by the public search engine, by:
        selecting an element that is present in the selected legitimate Web site and that relates to a characteristic identifying feature of the legitimate Web site;
        forming a search query using the selected element;
        submitting the search query to the indexed database of the selected public search engine; and
        receiving from the selected search engine a search report of Web sites in the search engine indexed database identified in response to the search query using the selected search element; and eliminating the preselected legitimate Web site from the Web sites identified in the search report;

comparing an additional element that is present in the Web sites identified in the search report that remain after eliminating the preselected legitimate Web site with a corresponding element present in the selected legitimate Web site;

using the comparison of the additional element to detect a difference from the selected legitimate Web site that is present in a Web site that remains after eliminating the preselected legitimate Web site to identify the Web site that remains as an unauthorized phishing Web site of the preselected legitimate Web site; and communicating the identity of the detected unauthorized phishing Web site of the selected legitimate Web site for further action.

2. The method claimed in claim 1 wherein the selected element is a selected substring of the URL of the selected legitimate Web site, and submitting the query comprises submitting the selected substring to a URL database of the public search engine to identify occurrences of the selected substring.

3. The method claimed in claim 1 wherein the selected element comprises unique identifying content found in at least one page of the selected legitimate Web site, and submitting the query comprises submitting the unique identifying content to the public search engine to search the indexed database of the search engine for pages with occurrences of the unique identifying content.

4. The method claimed in claim 1 wherein the selected element is a selected portion of the tree structure of the selected legitimate Web site, and submitting the query comprises submitting the portion of the tree structure to the public search engine to search the indexed database of the search engine for Web sites with occurrences of the selected tree structure.

5. The method claimed in claim 1 wherein comparing an additional element of the remaining Web sites comprises comparing meta-information of the remaining Web sites with meta-information of the selected legitimate Web site.

6. The method claimed in claim 1 wherein comparing an additional element of the remaining Web sites comprises forming an additional search query using the additional element and performing an additional search of the remaining Web sites with the additional search query to compare individual pages of the remaining Web sites with pages of the selected legitimate Web site.

7. The method claimed in claim 1 wherein comparing an additional element of a remaining Web site comprises comparing a portion of the tree structure of a remaining Web site with a portion of the tree structure of the selected legitimate Web site, selecting remaining Web sites with portions of tree structures that duplicate a portion of the tree structure of the selected legitimate Web site, and further comprising comparing a further element of the selected remaining Web sites that duplicate the portion of the tree structure of the preselected legitimate Web site with a corresponding further element of the selected legitimate Web site to identify the selected remaining Web site as an unauthorized phishing Web site of the preselected legitimate Web site.

8. The method claimed in claim 1 wherein the selected element is a characteristic feature of the selected legitimate Web site that is at least one of the name of a Web site owner, a trademark or service mark used in the Web site, the name of a product or service described in the Web site, a logo used in the Web site, or a block of text used in the Web site.

9. The method claimed in claim 1 wherein the selected element is a characteristic feature of the selected legitimate Web site that is at least one of the name of a Web site owner, a charity associated with the selected legitimate Web site, or text used in the selected legitimate Web site.

10. The method claimed in claim 1 further comprising, for the selected legitimate Web site, periodically repeating the submitting, receiving, eliminating and comparing to detect new occurrences of previously undetected phishing Web sites in the indexed database of Web sites accessible through the public search engine, and wherein communicating the identity of the unauthorized phishing Web site of the of the selected legitimate Web site for further action comprises communicating detected new occurrences of previously undetected phishing Web sites to the legitimate Web site owner.

11. The method claimed in claim 1 wherein communicating the identity of the detected unauthorized phishing Web site of the legitimate Web site for further action comprises at least one of alerting the legitimate Web site owner, alerting law enforcement authorities, posting information about the detected unauthorized phishing Web site of the legitimate Web site, and initiating steps to deny access to the detected site.

12. A non-transitory computer program product for causing a computer to locate a previously undetected phishing Web site, comprising:

computer readable program code means for causing a computer to select an element that is present in the legitimate Web site and that relates to a characteristic identifying feature of the legitimate Web site;

computer readable program code means for causing a computer to select an indexed public search engine that previously has crawled the Web, has identified mirror Web sites, and has created an indexed database of Web sites containing data already collected and indexed and excluding mirror Web sites that it uses to respond to search queries;

computer readable program code means for causing a computer to examine the indexed database of the selected public search engine for the presence of an unauthorized phishing Web site of the selected legitimate Web site, the unauthorized phishing Web site having differences from the legitimate Web site that prevent it from being identified as a mirror of the legitimate Web site by the public search engine, by:

computer readable program code means for causing a computer to form a search query using the selected element;

computer readable program code means for causing a computer to submit the search query to the indexed database of the public search engine;

computer readable program code means for causing a computer to receive from the search engine a search report of Web sites identified in response to the search query using the selected search element;

computer readable program code means for causing a computer to eliminate the legitimate Web sites from the Web sites identified in the search report;

computer readable program code means for causing a computer to compare an additional element that is present in the Web sites identified in the search report that remain after eliminating the legitimate Web site with a corresponding element present in the legitimate Web site;

computer readable program code means for causing a computer to use the comparison of the additional element to detect a difference from the legitimate Web site that is present in a Web site that remains after eliminating the legitimate Web site to identify the Web site that remains as an unauthorized phishing Web site of the preselected legitimate Web site; and computer readable program code means for causing a computer to communicate the identity of the Web site that remains as a detected unauthorized phishing Web site of the legitimate Web site for further action.

13. The non-transitory computer program product claimed in claim 12 wherein the selected element is a selected substring of the URL of the legitimate Web site, and the computer readable program code means for causing a computer to submit the search query comprises computer readable program code means for causing a computer to submit the selected substring to a URL database of the public search engine to identify occurrences of the selected substring.

14. The non-transitory computer program product claimed in claim 12 wherein the selected element comprises unique identifying content found in at least one page of the legitimate Web site, and the computer readable program code means for causing a computer to submit the search query comprises computer readable program code means for causing a computer to submit the unique identifying content to the public search engine to search the indexed database of the search engine for pages with occurrences of the unique identifying content.

15. The non-transitory computer program product claimed in claim 12 wherein the selected element is a selected portion of the tree structure of the legitimate Web site, and the computer readable program code means for causing a computer to submit the search query comprises computer readable program code means for causing a computer to submit the portion of the tree structure to the public search engine to search the indexed database of the search engine for Web sites with occurrences of the selected tree structure.

16. The non-transitory computer program product claimed in claim 12 wherein the computer readable program code means for comparing an additional element of the remaining Web sites comprises computer readable program code means for causing a computer to compare meta-information of the remaining Web sites with meta-information of the legitimate Web site.

17. The non-transitory computer program product claimed in claim 12 wherein the computer readable program code means for comparing an additional element of a remaining Web site comprises computer readable program code means for forming an additional search query using the additional element and performing an additional search of the remaining Web sites with the additional search query to compare individual pages of the remaining Web sites with pages of the legitimate Web site.

18. The non-transitory computer program product claimed in claim 12 wherein the selected element is a characteristic feature of the legitimate Web site that is at least one of the name of a Web site owner, a trademark or service mark used in the Web site, the name of a product or service described in the Web site, a logo used in the Web site, or a block of text used in the Web site.

19. The non-transitory computer program product claimed in claim 12 wherein the selected element is a characteristic feature of the legitimate Web site that is at least one of the name of a Web site owner, a charity associated with the preselected Web site, or text present in the legitimate Web site.

20. The non-transitory computer program product as claimed in claim 12 wherein the computer readable program code means further comprises computer readable program code means for causing a computer, for the legitimate Web site, to periodically repeat the submitting, receiving, eliminating and comparing steps to detect new occurrences of previously undetected phishing Web sites in the indexed database of Web sites accessible through the public search engine, and wherein the computer readable program code means for communicating the identity of the detected unauthorized phishing Web site of the of the selected legitimate Web site for further action comprises computer readable program code means for communicating detected new occurrences of previously undetected phishing Web sites to the legitimate Web site owner.

21. The non-transitory computer program product claimed in claim 20 wherein the computer readable program code means for causing a computer to communicate the identity of the detected unauthorized phishing Web site of the legitimate Web site for further action comprises computer readable program code means for at least one of alerting the legitimate Web site owner, alerting law enforcement authorities, posting information about the detected unauthorized phishing Web site of the legitimate Web site, and initiating steps to deny access to the detected site.

* * * * *